(12) United States Patent
Bushnell

(10) Patent No.: US 6,249,579 B1
(45) Date of Patent: Jun. 19, 2001

(54) APPARATUS, METHOD AND SYSTEM FOR PERSONAL TELECOMMUNICATION SPEED CALLING UTILIZING AN AFFINITY DATABASE

(75) Inventor: William J. Bushnell, St. Charles, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/087,412

(22) Filed: May 29, 1998

(51) Int. Cl.[7] .......................... H04M 1/27; H04M 1/56; H04M 1/57; H04M 3/44
(52) U.S. Cl. ................... 379/356; 379/216; 379/355
(58) Field of Search ................... 379/216, 356, 379/355

(56) References Cited

U.S. PATENT DOCUMENTS

| | | | |
|---|---|---|---|
| 5,452,340 | * | 9/1995 | Engelbeck et al. ............... 379/67 |
| 5,592,546 | * | 1/1997 | Takahashi ........................ 379/355 |
| 5,850,433 | * | 12/1998 | Rondeau ......................... 379/201 |
| 5,903,632 | * | 5/1999 | Brandon ......................... 379/93.23 |
| 5,903,634 | * | 5/1999 | Wakabayashi et al. ........... 379/127 |
| 5,917,904 | * | 6/1999 | Theis ............................... 379/355 |
| 5,930,350 | * | 7/1999 | Johnson .......................... 379/355 |
| 6,005,927 | * | 12/1999 | Rahrer et al. .................... 379/142 |
| 6,016,342 | * | 1/2000 | Schwartz ......................... 379/209 |

FOREIGN PATENT DOCUMENTS

WO 97/19546 * 5/1997 (WO) .................. H04M/3/42

\* cited by examiner

*Primary Examiner*—Tālivaldis I. Šmits
(74) *Attorney, Agent, or Firm*—Nancy R. Gamburd

(57) ABSTRACT

An apparatus, method and system are provided for personal telecommunication speed calling. The system includes a line unit couplable to customer premise equipment; a network signaling interface for receiving network signaling information; a network trunk interface for receiving corresponding network communications; a memory; and a processor coupled to the memory, to the line unit, to the network signaling interface, and to the network trunk interface. The processor includes instructions for generating a user specific affinity database, which contains names and corresponding telephone numbers of those people with whom the user has an affinity and therefore is likely to want to speed call. The affinity database is generated based upon affinity information derived from the user's outgoing calls and the user's incoming calls which have been answered and which have a minimum duration. The affinity database is ordered and displayed for the user, who may then select an affinity name for automatic speed calling of the corresponding affinity telephone number.

32 Claims, 7 Drawing Sheets

APPARATUS, METHOD AND SYSTEM FOR PERSONAL TELECOMMUNICATION SPEED CALLING UTILIZING AN AFFINITY DATABASE

CROSS-REFERENCE TO RELATED APPLICATION

This application is related to Bushnell, "Apparatus, Method and System for Personal Telecommunication Call Screening and Alerting", U.S. patent application Ser. No. 09/087,442, Lucent Technologies Docket No. 114,420, filed concurrently herewith and commonly assigned to Lucent Technologies, Inc., and incorporated by reference herein.

FIELD OF THE INVENTION

The present invention relates in general to telecommunication services and, more particularly, to an apparatus, method and system for personal speed calling.

BACKGROUND OF THE INVENTION

With the advent of sophisticated telecommunication services, telecommunication consumers frequently desire to utilize speed calling. In the prior art, telephone customers are able to utilize speed calling by, first, personally defining a list of telephone numbers that they frequently call, and second, by manually entering or programming all of those numbers into predefined locations within the user's telephone or the switching equipment of the local telephone network. Once the list is individually defined and manually programmed, the user may typically speed dial a number on the list by entering a short sequence of digits, or by pressing a programmed button on the user's telephone.

There are many difficulties and inconveniences associated with such current speed calling approaches. First, the user must take the time to define their individual speed calling list, and then take additional time to program each such number into the telecommunication equipment once the list is individually defined. Second, such programming is typically not user-friendly, and consumers often experience frustration and dissatisfaction with such required programming. Third, the user must personally manage the speed calling list, keeping track of each speed dial digit sequence which corresponds to each speed dial number, or keeping track of each name and number corresponding to a programmed speed dial button. Yet another disadvantage of current speed calling approaches, the user must also manually update their speed calling list, to add new numbers and names, and to delete other numbers and names. These current approaches to speed calling tend to be inconvenient, frustrating, and frequently annoying and dissatisfying to the typical consumer of telecommunication services.

As a consequence, a need remains for an apparatus, method and system that may be used by a telecommunication consumer to automatically speed dial their outgoing calls. Such speed calling should be automatic and occur without personal interruption and inconvenience, such as without any need to personally define and manually program a speed calling list. Rather, such speed calling should include automatically generating and managing a user specific speed calling database or list, without any required user intervention. Such an apparatus, method and system should be user friendly, and should be personalized and automatically tailored to the needs, tastes and preferences of individual customers. In addition, the apparatus, method and system should be cost effective and capable of implementation in existing telecommunication systems.

SUMMARY OF THE INVENTION

The present invention provides an apparatus, method and system for personal speed calling for outgoing calls, without consumer interruption and inconvenience associated with developing and maintaining a speed calling list. The present invention provides such automatic speed calling in accordance with the personal and tailored needs, tastes and preferences of the individual telecommunication consumer. In addition, the apparatus embodiment may be implemented in customer premise equipment, such as telephones, while the system embodiment may be implemented in existing telecommunication systems, such as network switches. The various embodiments may also be expanded to include more than voice communications, such as faxing, other data communications, and video conferencing.

The personal speed calling of the present invention incorporates an "organic persona" concept, such that not only are the services personalized or customized to the needs or preferences of individual consumers, but also the apparatus or system automatically learns these preferences by observing the actions or activities of the individual consumer. In accordance with the present invention, such personal and individualized automatic speed calling is based upon a statistical or other probabilistic likelihood that the individual consumer is more likely to want to speed call certain telephone or other telecommunication numbers, rather than others numbers, at a particular time. Such a likelihood is derived from a measure of an affinity between the calling and called parties, such that the speed calling party is more likely to want to place a call to someone with whom they have a greater or more significant affinity or association, such as their parent or child, and less likely to want to place a call to someone with whom they have a lesser or no affinity or association. As a consequence, calls having a greater affinity measurement are given a correspondingly higher priority in the speed calling process, and calls having a lesser affinity are given a correspondingly lower priority in the speed calling process.

Such affinity measures may be performed or derived in a variety of ways. In the preferred embodiment, the present invention measures such an affinity based upon two parameters. First, affinity is based upon the frequency of calls between the called and calling parties. For example, a higher affinity may exist between people who call each other frequently. Second, affinity is based on the duration or holding time of such calls, with calls having a brief duration indicative of a lower affinity, such as calls from telemarketers, wrong numbers, or prank calls. The telephone numbers corresponding to the calls having such a comparatively high affinity, in the preferred embodiment, are stored in an affinity database and are referred to herein as "affinity numbers".

A method for personal telecommunication speed calling, in accordance with the present invention, includes, first, selecting an affinity name from an affinity database. The affinity database is preferably ordered for ease of use, and easily displayed for the user. Second, the method automatically dials an affinity telephone number corresponding to the selected affinity name.

In the preferred embodiments, an affinity database is maintained which has a plurality of affinity names and corresponding affinity numbers. The telephone numbers included in the affinity database are determined by including telephone numbers corresponding to outgoing telecommunication calls, and by including telephone numbers (and names) corresponding to received incoming calls having a predetermined minimum duration. Other affinity name information, for example, to correspond to affinity telephone numbers of outgoing calls, is obtained in the preferred embodiment by accessing a name or other information database maintained by a service provider. The affinity database is maintained preferably as an affinity stack, with any affinity numbers having a comparatively higher frequency of use clustered in an upper portion of the affinity stack, and with any affinity numbers having a comparatively higher duration of use also clustered in an upper portion of the affinity stack.

Numerous other advantages and features of the present invention will become readily apparent from the following detailed description of the invention and the embodiments thereof, from the claims and from the accompanying drawings.

DETAILED DESCRIPTION OF THE PRESENT INVENTION

Figure 1:
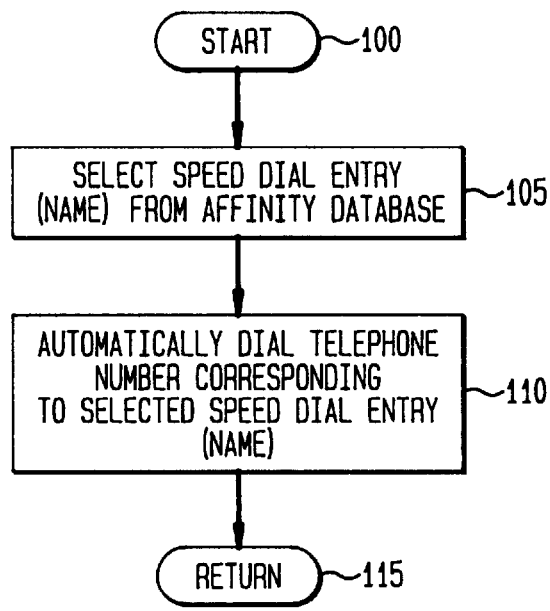
FIG. 1 is a flow diagram illustrating personal speed calling in accordance with the preferred embodiment of the method of the present invention.

As mentioned above, a need remains for an apparatus, method and system that may be used by a telecommunication consumer to automatically speed dial their outgoing calls from an automatically generated speed calling database. The various embodiments of the present invention provide such automatic speed calling and speed calling database generation, without personal inconvenience or involvement. The present invention obviates any need to personally define and manually program a speed calling list. Rather, in accordance with the present invention, a user specific speed calling database or list is automatically generated and managed, without any required user intervention. The apparatus, method and system provides such speed calling and database generation in accordance with the personal and tailored needs, tastes and preferences of the individual telecommunication consumer. In addition, the apparatus, method and system are user friendly, cost effective, and capable of implementation in existing telecommunication systems.

The personal speed calling of the present invention incorporates an "organic persona" concept. "Persona" refers to services that are personalized or customized to the needs or preferences of individual consumers. "Organic" refers to services in which a telecommunication network or system automatically learns these preferences by observing the actions or activities of the individual consumer.

In accordance with the present invention, such personal and individualized automatic speed calling is based upon a statistical or other probabilistic likelihood that the individual consumer does or does not, in fact, want to generate or place an outgoing call to a particular destination or called party at a particular time. Such a probabilistic likelihood is derived from a measure of an affinity between the calling and called parties, such that the calling party is more likely to want to place a call to someone with whom they have a greater or more significant affinity or association, such as their parent or child, and less likely to want to place a call to someone with whom they have a lesser or no affinity or association. As a consequence, in accordance with the present invention, calls having a greater affinity measurement are given a correspondingly higher priority in the speed calling process, and calls having a lesser affinity are given a correspondingly lower or non-existent priority in the speed calling process.

Such affinity measures may be performed or derived in a variety of ways. As an automatic speed calling process, in the preferred embodiment, the present invention measures such an affinity based upon two measurable parameters. First, affinity is based upon the frequency of calls between the called and calling parties. For example, a higher affinity may exist between people who call each other frequently. Second, affinity is based on the duration or holding time of such calls, with calls having a brief duration indicative of a lower affinity, such as calls from telemarketers, wrong numbers, or prank calls.

As discussed in greater detail below with respect to FIGS. 1–5, the present invention utilizes these calling patterns, frequency and duration, to create an affinity database. In the preferred embodiment, the affinity database is implemented as an affinity stack (or list) which contains the names of the parties (or destinations), and corresponding telephone numbers, who (or which) the individual consumer may preferentially want to call. Other methods of managing an affinity database may also be utilized. The affinity database is displayed to the consumer in any number of desirable forms or formats, such as alphabetically, ranked by frequency of use, ranked by other priorities, or as preferentially flagged by user input. The affinity database may also have different content depending upon the time of day or time period, such as business affinity names and numbers during the work day, and personal affinity names and numbers during the evening and weekends. In accordance with the present invention, the user selects an affinity name from the affinity database, and the corresponding affinity telephone number is automatically called (or dialed). In addition, in the preferred embodiment, the consumer also may program his or her preferences, priorities, categories, and activation or deactivation times.

As a consequence, as utilized herein, "affinity database" should be understood to consist of a plurality of affinity names and corresponding affinity numbers, with the plurality of affinity names and plurality of corresponding affinity numbers determined by including telephone numbers corresponding to outgoing telecommunication calls, and by including names and corresponding telephone numbers from received incoming calls having a predetermined minimum duration.

FIG. 1 is a general flow diagram illustrating personal speed calling in accordance with the preferred method embodiment of the present invention. As discussed in greater detail below, the methodology of the present invention, as illustrated in FIGS. 1–5, may be programmed and stored, as a set of program instructions for subsequent execution, in a processor and its associated memory. Such processor embodiments are illustrated as apparatus and system embodiments in FIGS. 6, 7 and 8.

Referring to FIG. 1, beginning with start step 100, the method begins with selection, typically by a user, of a speed dial entry from an affinity database, such as selection of an affinity name, step 105. Generation and management of such an affinity database, and its ordering, are discussed in greater detail below with reference to FIGS. 2–5. Next, in step 110, the telephone number corresponding to the selected affinity name is automatically dialed, and the method may end, return step 115.

As indicated above, instead of inconveniencing the consumer, in accordance with the present invention, a list or database of speed calling names and numbers is automatically generated and maintained based on a measure of affinity. In the preferred embodiment of the invention, affinity is measured or determined utilizing the concept that consumers have a higher affinity and are more likely to want to place calls, first, to people that they themselves have called previously, or second, to people who have called them previously and with whom they have had long conversations, or both. Conversely, a lesser or non-affinity is based upon consumers being less likely to want to place a call to people whom they have never previously called, or to people who have called them but with whom they have never had a long conversation. As illustrated in greater detail below with respect to FIGS. 2–5, the preferred method embodiment develops an affinity database as an affinity list of preferred names and corresponding telephone numbers, by storing the telephone numbers of all calls originated by the user's telephone, and storing incoming caller ID information (name and number) from those telephone calls having a minimum, predetermined duration. Names corresponding to outgoing telephone numbers, or names corresponding to incoming telephone numbers (when names were not included in incoming caller ID information), are obtained from an information database, which may be provided by a telecommunication service provider. As the affinity database is maintained, a list or stack format is utilized, to incorporate a frequency measurement or determination of called and calling names and numbers within the affinity database, such that high frequency names and numbers are in the top or upper portion of the affinity list or stack.

A wide variety of other equivalent methods of database management may also be utilized to organize and manage the affinity database, including user input and programming options. For example, as the affinity database is generated, user input may be utilized to add or delete names and telephone numbers. Also for example, such user input may occur through an interactive voice menu or an interactive display. Also as mentioned above, another possible method of assigning and managing the affinity database may be based on the duration of the call. These various methods of management and prioritization may also be combined, utilizing any number of ordering or statistical algorithms.

In the preferred embodiment, through a user input and a user display, the user may select or program various alternatives and preferences. For example, the user may manually override the automatic selections, such as deleting or adding a name and corresponding telephone number from or to the affinity database, or selecting a higher or lower priority for a given name and telephone number in the affinity database. For example, there may be names and corresponding telephone numbers for people that the user always wants to be able to speed call, even if they are not frequent or long duration calls. As a consequence, through a user display of their personal affinity database, with a user input, the user may flag or designate certain names and corresponding telephone numbers for particular treatment, may add names and telephone numbers which otherwise would not be in the affinity database, may delete names and telephone numbers, and may provided that certain numbers always remain in the database (even if used infrequently). This user interactive method and system may also be implemented, for example, using interactive voice response with menu options, for example, indicating varying levels of priority treatment, recording of outgoing messages, and means to add, delete, and flag various names and telephone numbers.

The apparatus, method and system may also be programmed to automatically activate and deactivate various speed calling databases at specified times of the day, for example, with a business database during the work day and a personal database during the evening.

Figure 2:
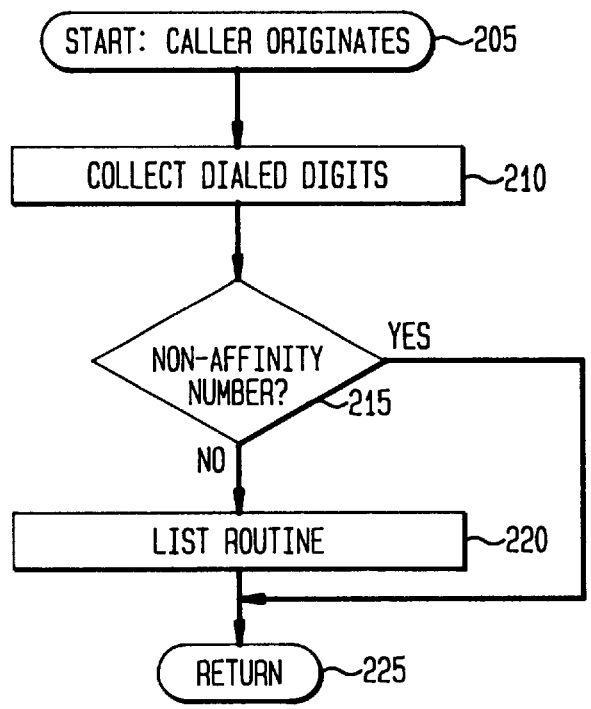
FIG. 2 is a flow diagram illustrating an affinity data generation routine from caller originated communications in accordance with the method of the present invention.

FIG. 2 is a flow diagram illustrating an affinity data generation routine based upon user originated calls. The method begins, start step 205, when the user originates a telephone call or other telecommunication session. The method collects and stores the dialed telephone number (digits), step 210, such as the numerical digits entered by the caller. Next, in step 215, the method determines whether the collected dialed digits are for a non-affinity number, such as 800 or 888 numbers, 911 emergency numbers, 411 and 1-area code-555-1212 directory assistance calls. When the dialed digits are for such a non-affinity number in step 215, the affinity data generation routine may end, return step 225. When the dialed digits are not for a non-affinity number in step 215, i.e., the dialed digits are for an ordinary number, that number is then added to the affinity database, step 220, which is illustrated in detail as an affinity stack routine in FIG. 5. Following step 220, the caller originated data generation routine of the preferred method embodiment may end, return step 225.

Figure 3:
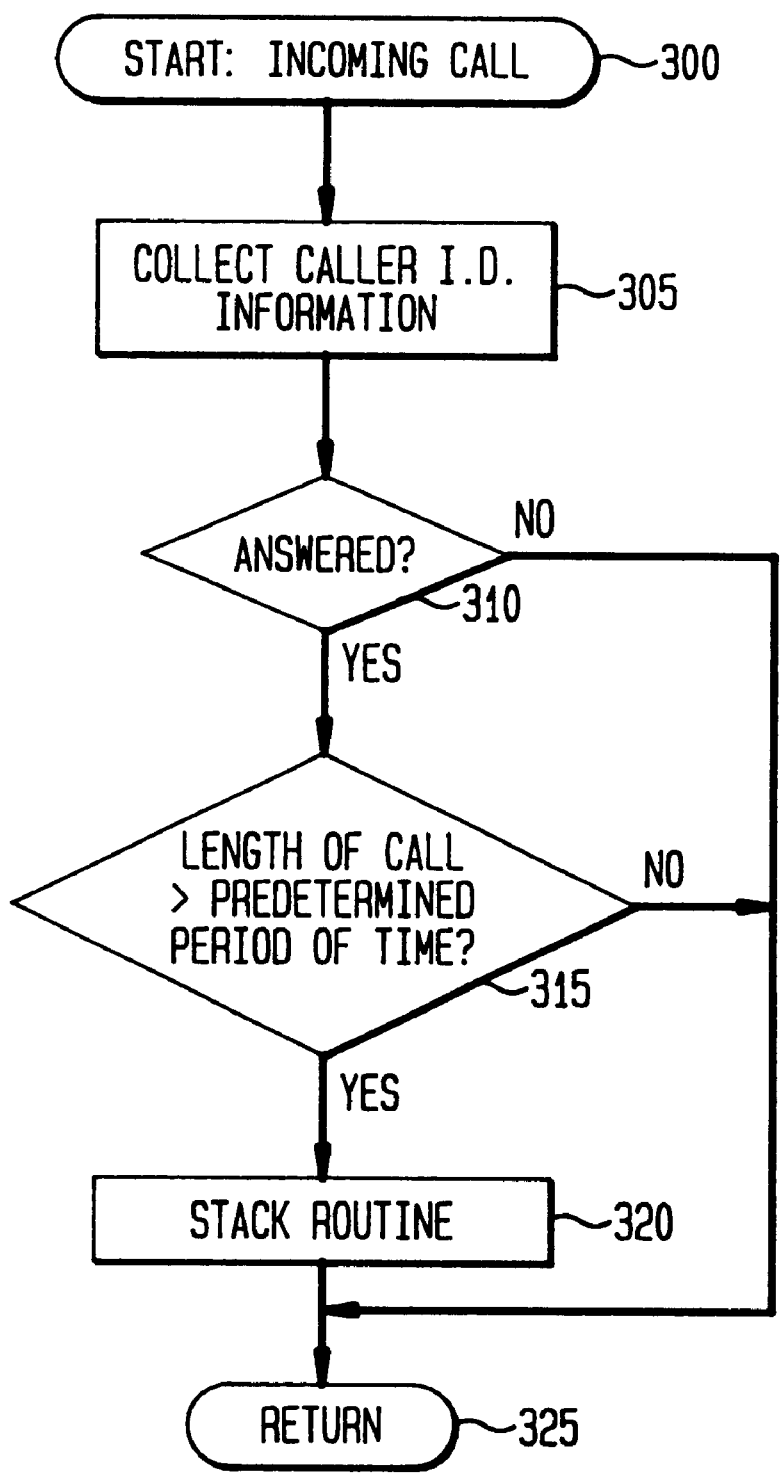
FIG. 3 is a flow diagram illustrating an affinity data generation routine from incoming calls in accordance with the method of the present invention.

FIG. 3 is a flow diagram illustrating affinity data generation based upon incoming calls. Beginning with reception of an incoming call, start step 300, the method collects and stores caller ID information, step 305, preferably the name and corresponding telephone number of the calling party. When the user has answered or accepted the incoming call, step 310, and when the duration or length of that call is greater than a minimum or other predetermined period of time, step 315, then the caller ID information for that incoming call is added to the affinity database, step 320, which is also illustrated in greater detail with respect to FIG. 5. In the preferred embodiment, the user may specify or program what predetermined period of time he or she would like as a minimum incoming call duration for adding an incoming call name and number to the affinity database, based on his or her individual conversation patterns. For example, a particular user may feel that only incoming calls lasting more than five minutes should be included in the affinity database, while another less talkative user may want all calls lasting more than three minutes. Default values may also be provided for the predetermined period of time, such as three minutes. In addition, varying values may also be provided, with correspondingly higher priorities assigned to longer calls. When either the user either does not answer the incoming call (in step 310), or when the duration of the incoming call is less than the predetermined period of time (in step 315), the method does not add that caller ID information to the affinity database, and the incoming call affinity database generation routine of the preferred method embodiment may end, return step 325. As mentioned above, as an affinity measurement, the method presumes that an unanswered call or a call of such a short duration is due to the unwanted nature of the incoming call, and as a consequence, that incoming caller ID information is not added to the affinity database.

Figure 4:
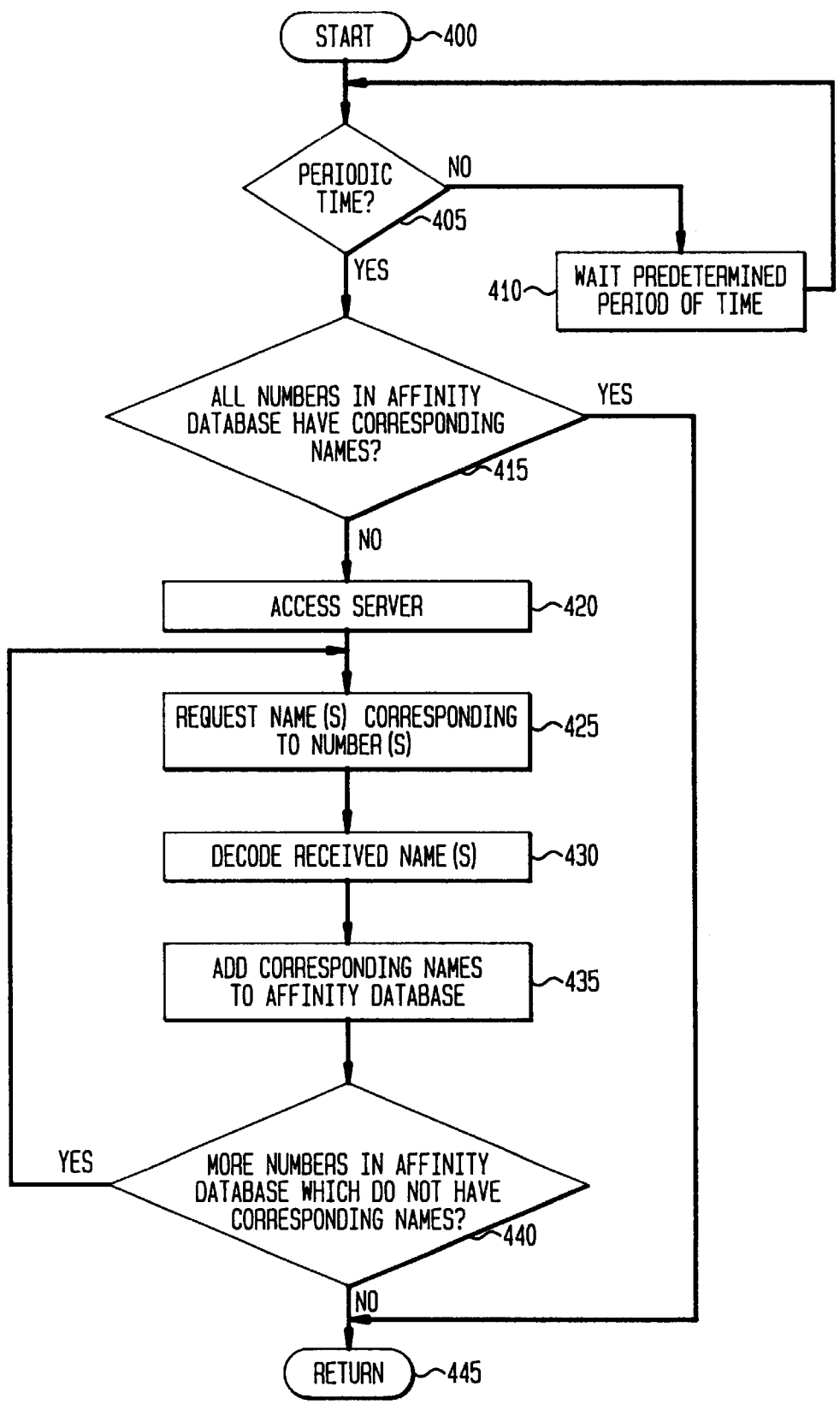
FIG. 4 is a flow diagram illustrating an affinity name generation routine in accordance with the preferred embodiment of the method of the present invention.

FIG. 4 is a flow diagram illustrating an affinity name generation routine in accordance with the preferred embodiment of the method of the present invention. Under various circumstances, such as when a number in the affinity database was user generated via the call origination routine of FIG. 2, name information generally will not have been provided. Indeed, an important feature of the present invention is that the user does not need to personally provide such information and, in accordance with the routine of FIG. 4, such affinity name information is automatically and periodically provided and placed into the affinity database. Name information, however, may be provided with incoming caller ID information of step 305 and if so, such incoming names may be matched to corresponding dialed numbers in step 320 above, when the incoming information is added to the affinity database. As a consequence, the routine of FIG. 4 is generally used, first, when incoming caller ID information has not included a corresponding name, or second, when outgoing, dialed digits do not correspond or match with any incoming caller ID information (having both a telephone number and a corresponding name).

Referring to FIG. 4, beginning with start step 400, the method determines if it is the appropriate or periodic time to add the missing names (corresponding to affinity telephone numbers) to the affinity database, step 405. In the preferred embodiment, this routine is preferentially performed during non-peak times, with any desired frequency. For example, a user may want the affinity database updated daily or weekly, at a non-peak time such as 3 a.m. Other users may want more frequent updating, such as twice daily, while others may want less frequent updating, such as weekly. As a consequence, in step 405, the method determines whether it is such an appropriate time, and if not, proceeds to step 410, to wait a predetermined period of time, then returning to step 405 to again determine whether the appropriate time has arrived. When it is the appropriate or other periodic time to commence the affinity name generation routine in step 405, the method determines whether there are any missing names in the affinity database, i.e., whether there are one or more telephone numbers in the affinity database which do not have corresponding names, step 415. If all telephone numbers in the affinity database have corresponding names in step 405, such that there are no missing names, the affinity name generation routine may end, return step 445. When not all of the telephone numbers in the affinity database have corresponding names in step 415, i.e., there are one or more missing names, then the method proceeds to step 420 to access a network server or other information provider. For example, the user's telephone may automatically dial up and connect with a name information server provided by a local, regional, national or international telecommunication service provider. Following server access, in step 425, the method generates a request to the server to provide the name corresponding to the affinity telephone number (which previously did not have a corresponding name). The server then provides the corresponding name, typically in an encoded format corresponding to the type of service and telecommunication equipment; as a consequence, the method then receives and decodes the corresponding name provided by the server, step 430. For example, for "POTS" service, the name information may be FSK (frequency shift keying) encoded; for ISDN service, the name information may be included within D channel signaling, and for T1/E1 service, the name information may be provided with in-band signaling, such as robbed bit signaling. The received corresponding name is then added to the affinity database (with reference to the corresponding affinity telephone number), step 435. The method then determines whether there are any additional telephone numbers in the affinity database which do not have corresponding names, step 440. When there are one or more additional telephone numbers in the affinity database which do not have corresponding names in step 440, the method returns to step 425, 430 and 435 to request, receive and add each such missing name to the affinity database. When there are no more additional telephone numbers in the affinity database which do not have corresponding names in step 440, i.e., all telephone numbers in the affinity database have corresponding names, the affinity name generation routine may end, return step 445.

In various system embodiments discussed with reference to FIGS. 7 and 8, the network itself may directly download this affinity database information to the user premise equipment, including such missing names. In such system embodiments, the separate step 420 of accessing a server may be omitted, with the network potentially having direct access to this information in its own databases.

Figure 5:
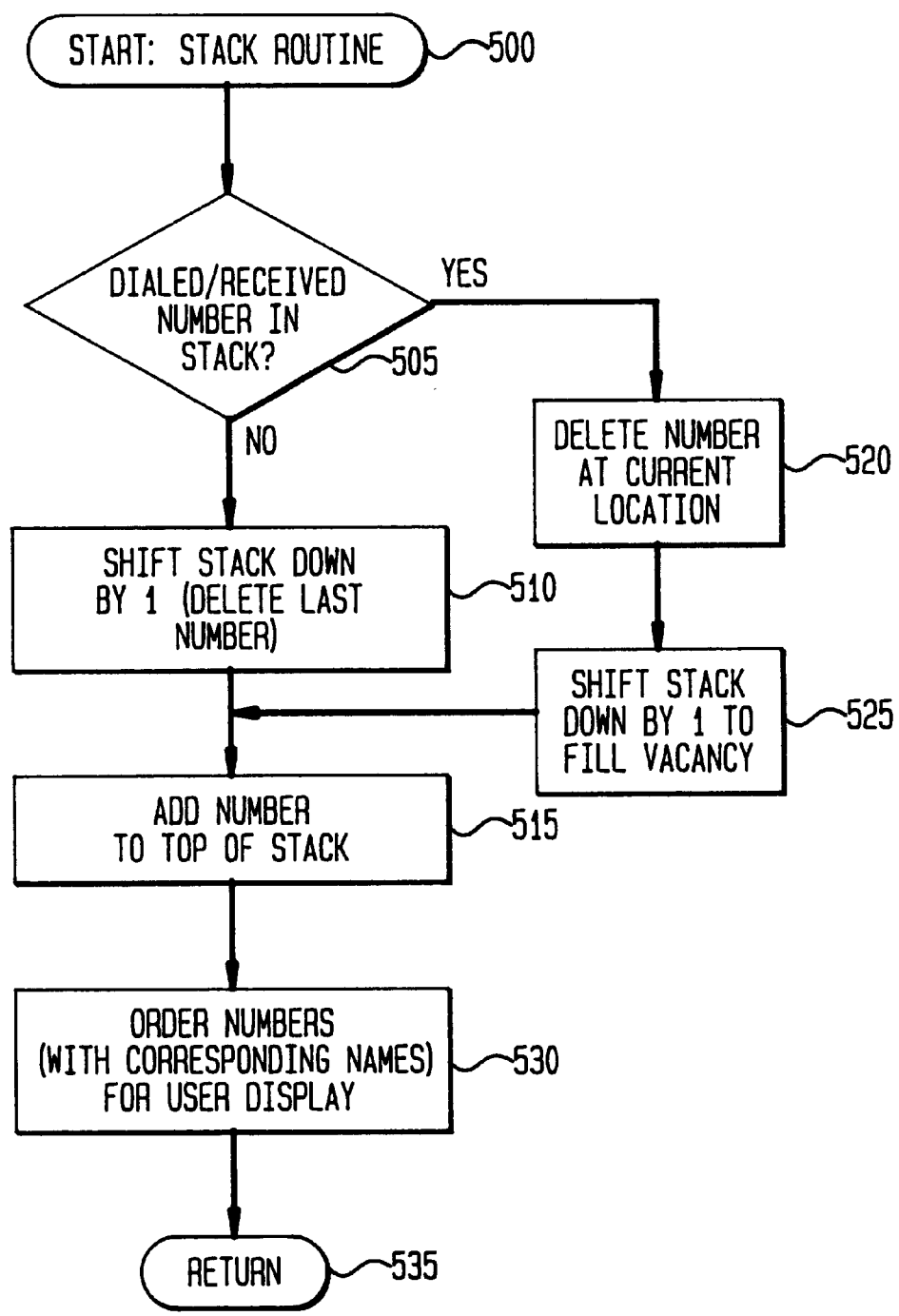
FIG. 5 is a flow diagram illustrating affinity list or stack generation and maintenance in accordance with the preferred method embodiment of the present invention.

FIG. 5 is a flow diagram illustrating affinity stack (or list) generation and maintenance routine in accordance with the preferred method embodiment of the present invention. Beginning with start step 500, as mentioned above, this routine is called or invoked from either step 220 (FIG. 2) or step 320 (FIG. 3), and is utilized to add a new affinity name and telephone number to the affinity database, or to change a position of an affinity name and telephone number within an ordering of the affinity database. Also as mentioned above, in preferred embodiment, the affinity database is managed as a list or a stack, with high frequency affinity numbers clustered at the top or upper portion of the stack. As such, these high frequency affinity numbers in the upper portion of the stack may also be considered to be higher priority affinity numbers. There are, however, myriad other equivalent ways of managing the affinity database and assigning such priorities, including user input and user programming options. As mentioned above, one such additional method of assigning and managing priorities may be based on the duration of the call, with an affinity name and telephone number assigned a greater priority based upon a longer duration of a call. These various methods of prioritization may also be combined, utilizing any number of ordering or statistical algorithms.

In addition, the preferred method of the present invention, as embodied in this database stack routine, presumes that there is a finite amount of memory or other storage capacity for storing the individual user's affinity database. In addition, there is also typically a finite amount of processing time available for database searching, and extremely fast processing is preferred for consumer satisfaction. As a consequence of such a finite amount of memory and finite processing time, in the preferred embodiment, the affinity database is also generated and managed on a finite basis, with comparatively higher frequency/higher priority affinity names and corresponding telephone numbers preferably retained in lieu of comparatively lower frequency/lower priority affinity names and corresponding telephone numbers. In the event of a space shortage or other conflict, the lower frequency or lower priority names and numbers are deleted from the database. Enough memory and processing capability may be utilized, however, such that a complete, undeleted database also may be available to a typical consumer (e.g., having sufficient memory and processing capability for several hundred potential affinity names and corresponding telephone numbers).

Referring to FIG. 5, following invocation of this routine in start step 500, the routine begins with determining whether either the dialed telephone number (and corresponding name) (from step 220, FIG. 2) or the received number (and corresponding name) (from step 315, FIG. 3) are currently in the affinity stack or list, step 505. When the dialed or received name and number are not currently in the affinity stack in step 505, the method proceeds to shift all entries in the affinity list down by 1 (also thereby potentially deleting the last affinity name and telephone number on the affinity list, if any, when memory space may be limited), step 510. The new affinity number (and corresponding name, if any) is then added to the top of the stack, step 515. In step 505, when the dialed or received telephone number (and corresponding name) are already in the affinity database, the method proceeds to step 520, and deletes that telephone number (and corresponding affinity name) at their current stack location, leaving a vacancy in the stack. The method then shifts all higher frequency affinity names and telephone numbers down by 1 to fill the vacancy, step 525, and adds the current affinity name and telephone number to the top of the stack, step 515. In this way, affinity names and telephone numbers used with the most frequency or used most recently, comparatively, are retained toward the top or upper portion of the stack and, as mentioned above, may be assigned a corresponding priority based upon stack location. Also as mentioned above, a wide variety of equivalent alternatives are available for such stack or memory management, including prioritization based upon other or additional factors besides frequency, such as call duration as mentioned above, or calls received during a previous period of time, such as the previous thirty days. Following step 515, the affinity numbers (and corresponding names) are placed into a desired order for display to the user, step 530, such as an alphabetical order or a user defined categorization (such as business and personal categories). Following the ordering step 530, the database stack management routine may end, return step 535.

Not separately illustrated, when the affinity database is also to be maintained as a stack, other management methods may be utilized in lieu of or in addition to the methodology illustrated in FIG. 5. For example, new received or dialed telephone numbers and corresponding names may be inserted initially into the middle or center of the stack. Subsequently, when used with greater or lesser comparative frequency, a corresponding name and telephone number will, respectively, percolate up in the stack or be pushed down in the stack. As a consequence, such a methodology would incorporate the frequency parameter illustrated in FIG. 4, without simultaneously incorporating a recency parameter as well.

Figure 6:
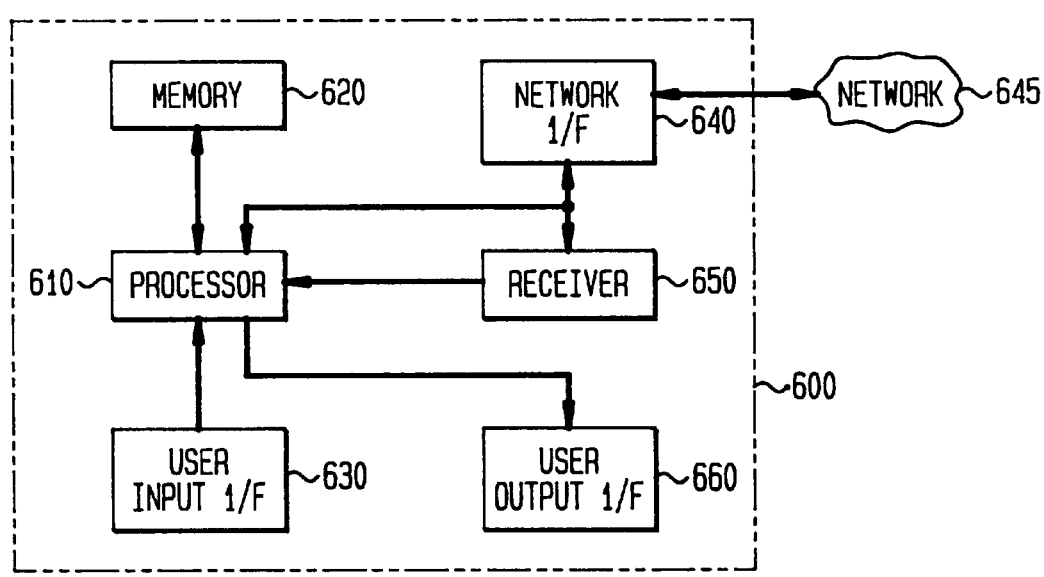
FIG. 6 is a block diagram illustrating an apparatus embodiment in accordance with the present invention.

FIG. 6 is a block diagram illustrating an apparatus embodiment in accordance with the present invention. The apparatus 600 may be included, for example, in a telephone or other customer premise equipment. Referring to FIG. 6, the apparatus 600 includes a processor 610, a memory 620, a user input interface 630, a network interface 640, a receiver 650, and a user output interface 660. In the preferred embodiment, the user output interface 660 may have one or more output devices such as a visual display for displaying the affinity database for speed calling, an alerting mechanism such as a ringer, and/or a messaging or answering mechanism.

Continuing to refer to FIG. 6, the processor 610 (and processor 710 of FIGS. 7 and 8) may include a single integrated circuit ("IC"), or may include a plurality of integrated circuits or other components connected, arranged or grouped together, such as microprocessors, digital signal processors ("DSPs"), application specific integrated circuits ("ASICs"), associated memory (such as RAM and ROM), and other ICs and components. As a consequence, as used herein, the term processor should be understood to equivalently mean and include a single processor, or arrangement of processors, microprocessors, controllers, or some other grouping of integrated circuits which perform the functions discussed herein, with associated memory, such as microprocessor memory or additional RAM, ROM, EPROM or $E^2PROM$. As indicated above with reference to FIGS. 1–5, the methodology of the invention may be programmed and stored, in the processor 610 (or processor 710, FIGS. 7 and 8) with its associated memory and other equivalent components, as a set of program instructions for subsequent execution when the processor 610 or 710 is operative (i.e., the processor 610 or 710 is powered on and functioning).

The user input interface 630, such as a keypad, is utilized to receive input from the user, such as the input of a number to be dialed. The user input interface 630 may also be utilized for manual overrides, affinity name and telephone number addition or deletion, and user preference programming as discussed above. The memory 620 is utilized for the storage of the user's affinity database. The network interface 640 provides connectivity to a network 645, such as providing tip and ring connections to a public (or general) switched telephone network. The receiver (or decoder) 650 is utilized to decode incoming signals which encode incoming caller ID information, such as FSK (frequency shift keying) encoded information. An equivalent or another type of receiver or decoder may also be utilized in the event incoming caller ID information is encoded in another format, such as for D channel signaling or robbed bit signaling. The user output interface 660, as mentioned above, may contain one or more output devices both to alert or signal the user to an incoming call, and to display the user's affinity database. For example, the user output interface 660 may include an auditory or other audible ringer, a visual display such as an LCD display, and a telephone call answering or voice mail system.

As discussed above with reference to FIG. 3, when an incoming call is received by the network interface 640, incoming caller ID information is decoded by receiver 650, and collected (FIG. 3, step 305) and examined by processor 610. The processor 610 monitors the incoming call, and when the incoming call is answered (step 310) and when the duration of the incoming call is greater than a predetermined period of time (step 315), the processor 610 then determines whether the incoming caller information (name and telephone number) should be added to or is already within the affinity database, as stored within the memory 620 (step 320).

Similarly, the processor 610 creates the affinity database, to be stored in memory 620, from user originated calls (the routine of FIG. 2) via the user input interface 630. The processor 610 collects the dialed digits (step 210), determines whether the dialed telephone number should be added to the affinity database (step 215), and then performs affinity database processing (step 220) with the memory 620. The processor 610 also manages the affinity database or stack via its program instructions (the method of FIG. 5) and the memory 620.

The processor 610 also performs the functionality illustrated in FIG. 4. Periodically (steps 405 and 410), as described in detail above, the processor 610 will determine whether there are any missing names for the telephone numbers in the affinity database (step 415). When not all of the telephone numbers have corresponding names in the affinity database, the processor 610, utilizing the memory 620 and the network interface 640, accesses a network server (step 420), such as by instructing the network interface 640 to generate DTMF tones (dialing) corresponding to a network telecommunication number stored in memory 620, or any other form of dialing utilized with the corresponding service, such as ISDN. The processor 610 then generates a request to the server, transmitted by the network interface 640, for a name to correspond to an affinity telephone number (step 425). A name generated by the server is received by the network interface 640 and, if encoded, the received name is then typically decoded by the receiver (or decoder) 650 (step 430). The processor 610 then adds the name to the corresponding telephone number in the affinity database (step 435). The processor 610 continues this procedure until there are no more missing names in the affinity database (step 440).

Figure 7:
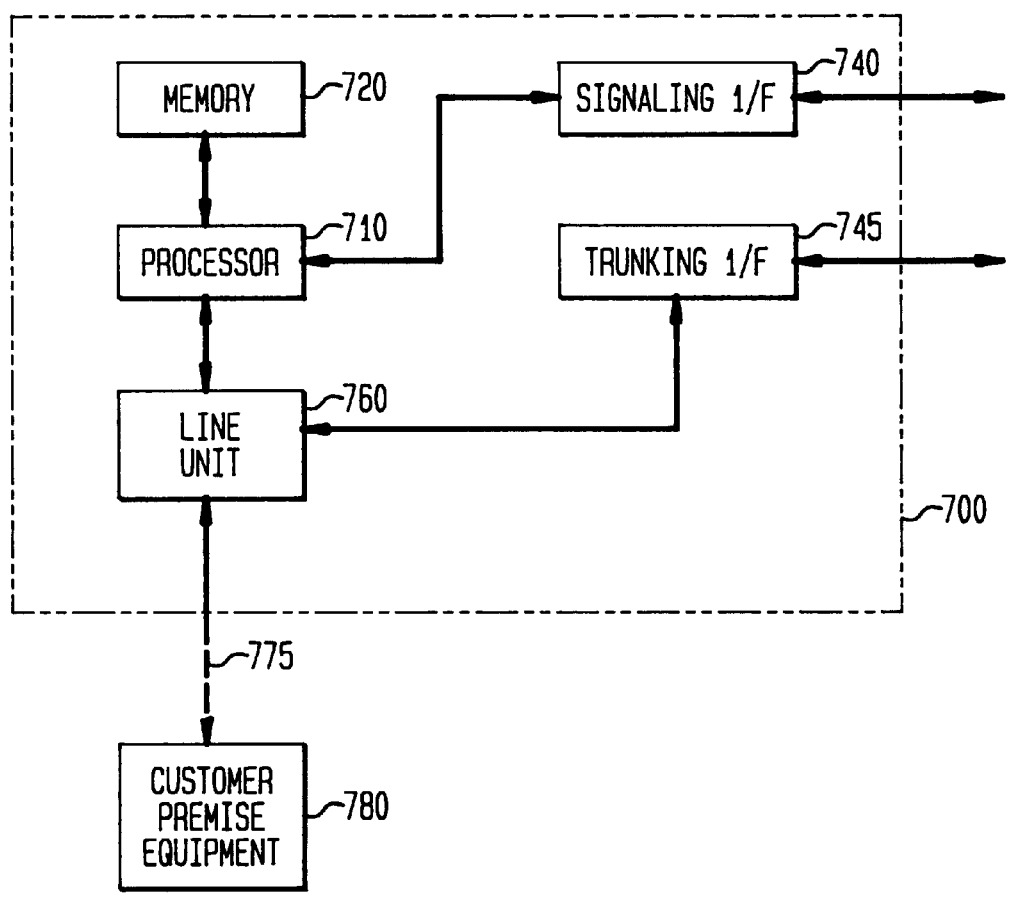
FIG. 7 is a block diagram illustrating a first system embodiment in accordance with the present invention.

FIG. 7 is a block diagram illustrating a system embodiment in accordance with the present invention. The system 700 may be included within, for example, a telephone network switch, a network central office, or within other telecommunication service provider equipment which provides service to customer premise equipment 780. As in the apparatus 600 embodiment, the system 700 also includes a processor 710 and a memory 720. The system 700 also includes a signaling interface 740 (such as an SS7 signaling interface) for, among other things, interfacing to a signaling portion of a network, and a trunk (or trunking) interface 745 for interfacing to a voice (or data) portion of a network. For telecommunications, such as voice and data communications, the signaling portion of the network typically transports caller ID information. At the same time, the trunking interface 745 (or trunking portion of the network) provides the path for a corresponding network communication, such as the path for a voice or data call. The system 700 is couplable typically through a twisted pair communication channel 775 to customer premise equipment 780 via a line unit 760.

As discussed above with reference to FIG. 3, when an incoming call to a particular user is received by the signaling interface 740, caller ID information is collected and examined by processor 710 (FIG. 3, step 305). The processor 710 monitors the incoming call, and when the incoming call is answered (step 310) and when the duration of the incoming call is greater than a predetermined period of time (step 315), the processor 710 then determines whether the incoming caller information should be added to or is already within the affinity database, as stored within the memory 720 (step 320).

Similarly, the processor 710 creates the affinity database, to be stored in memory 720, from user originated calls (the routine of FIG. 2) via the line unit 760, collecting the digits (telephone number) dialed by the user. The processor 710 also manages the affinity database or stack via its program instructions (the method of FIG. 5) and the memory 720. For this system embodiment, the ordered affinity database (step 530, FIG. 5) is transmitted via line unit 760 to a user display in customer premise equipment 780.

The processor 710 also performs the functionality illustrated in FIG. 4. Periodically (steps 405 and 410), as described in detail above, the processor 710 will determine whether there are any missing names for the affinity telephone numbers in the particular user's affinity database (step 415). When not all of the numbers have corresponding names in the user's affinity database, the processor 710, utilizing the memory 720, accesses its own databases (or its own network server), and requests a name to correspond to an affinity number (step 425) of the particular user's affinity database. The processor 710 then adds the name to the corresponding number in the particular user's affinity database (step 435). The processor 710 continues this procedure until there are no more missing names in the user's affinity database (step 440). The affinity database is preferably stored within the memory 720, and also may be ordered and transmitted to the customer premise equipment (CPE) 780, for user display, user interaction, and local storage.

For this system 700 embodiment (and the system 800 embodiment discussed below), the various forms of user input discussed above may also be implemented via use of the CPE 780. In addition, when the affinity database is stored and maintained in the memory 720, it may be periodically downloaded to the CPE 780 for user input and user interactivity. For example, the user's affinity database may be displayed, edited, categorized, prioritized, and generally individually managed via the CPE 780. In addition, the system 700 may also provide an interactive menu to the user, such as providing menu options or other means of programming user preferences.

Figure 8:
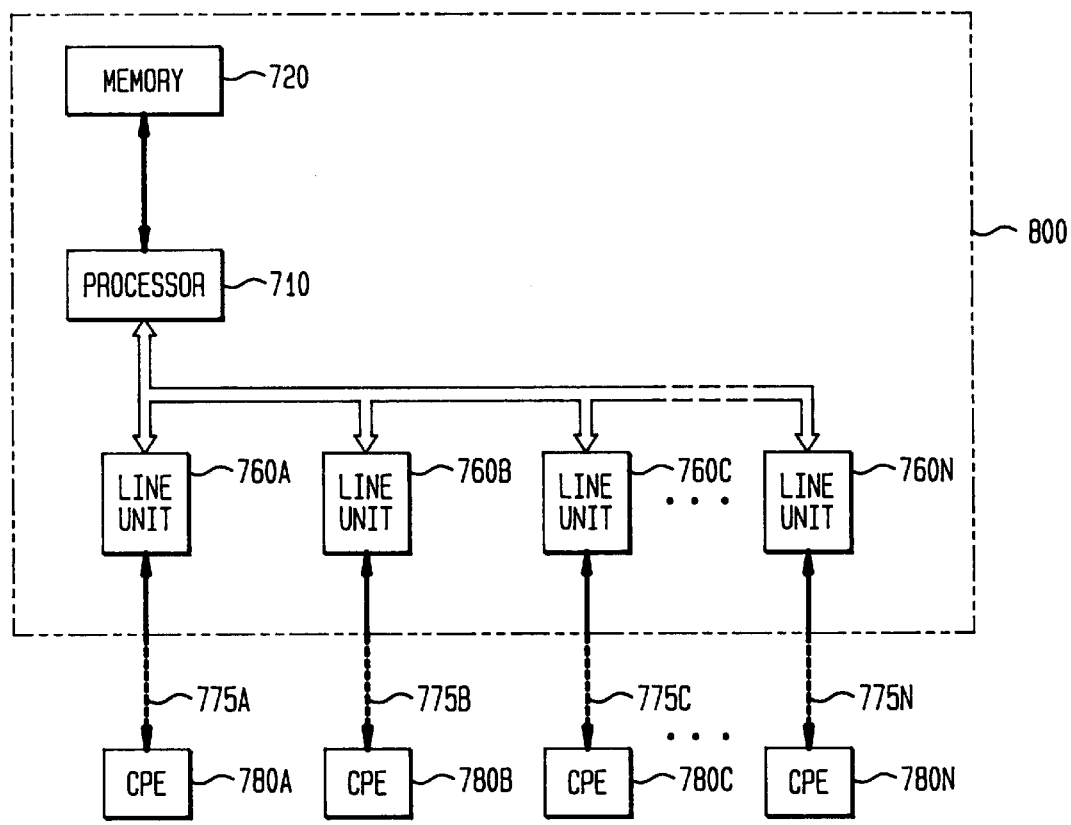
FIG. 8 is a block diagram illustrating a second system embodiment in accordance with the present invention.

FIG. 8 is a block diagram illustrating a second system embodiment in accordance with the present invention. The system 800 also may be included within, for example, a telephone network switch, in a network central office, or within other telecommunication service provider equipment which provides service to customer premise equipment ("CPE") 680A, 680B, 680C through 680N. The system 800 is utilized for line to line calls and, as a consequence, does not require the signaling interface 640 or the trunk interface 645 of the system 700. As in the apparatus 600 embodiment and the system 700 embodiment, the system 800 also includes a processor 610 and a memory 620. The system 800 embodiment additionally includes a plurality of line units 760A, 760B, 760C through 760N (collectively line units 760), which are respectively couplable to a corresponding plurality of CPEs 780A, 780B, 780C through 780N (collectively CPEs 780), via respective communication channels 775A, 775B, 775C through 775N. Typically, and in the preferred embodiments, the systems 700 and 800 are combined into one overall system for handling both trunk calls and line to line calls.

As discussed above with reference to FIG. 3, when an incoming call to a particular user is received by one of the line units 760, caller ID information is collected and examined by processor 710 (FIG. 3, step 305). The processor 710 monitors the incoming call, and when the incoming call is answered (step 310) and when the duration of the incoming call is greater than a predetermined period of time (step 315), the processor 710 then determines whether the incoming caller information should be added to or is already within the affinity database, as stored within the memory 720 (step 320).

Similarly, the processor 710 creates the affinity database, to be stored in memory 720, from user originated calls (the routine of FIG. 2) via the line units 760, collecting the digits (telephone number) dialed by the user. The processor 710 also manages the affinity database or stack via its program instructions (the method of FIG. 5) and the memory 720. Also for this system 800 embodiment, the ordered affinity database (step 530, FIG. 5) is transmitted via one of the line units 760 to a user display in a corresponding CPE 780.

As described above with respect to system 700, for the system 800, the processor 710 also performs the functionality illustrated in FIG. 4. Periodically (steps 405 and 410), as described in detail above, the processor 710 will determine whether there are any missing names for the affinity telephone numbers in the particular user's affinity database (step 415). When not all of the numbers have corresponding names in the user's affinity database, the processor 710, utilizing the memory 720, accesses its own databases (or its own network server), and requests a name to correspond to an affinity number (step 425) of the particular user's affinity database. The processor 710 then adds the name to the corresponding number in the particular user's affinity database (step 435). The processor 710 continues this procedure until there are no more missing names in the user's affinity database (step 440). The affinity database is preferably stored within the memory 720, and also may be ordered and transmitted to the customer premise equipment (CPE) 780, for user display, user interaction, and local storage, also as discussed above. When the system 800 is combined with system 700, for both line to line calls and trunk calls, all of these various functions may be performed by the same processor 710, accessing the same network database or network server.

As may be apparent from the above discussion, the various embodiments of the present invention are not limited to voice communications, but may be extended to a wide variety of modem telecommunications. The various embodiments may also be applied to newer types of communication, such as video conferencing and other video communications.

Numerous other advantages of the present invention may be apparent from the above discussion. The various embodiments of the present invention provide automatic speed calling, without personal inconvenience or involvement. The present invention obviates any need to personally define and manually program a speed calling list, and a user specific speed calling database or list is automatically generated and managed, without any required user intervention. The apparatus, method and system provides such speed calling in accordance with the personal and tailored needs, tastes and preferences of the individual telecommunication consumer. In addition, the apparatus, method and system are user friendly, cost effective, and capable of implementation in existing telecommunication systems.

The present invention is able to provide such automatic personal peed calling while incorporating the "organic persona" concept. Not only are these services personalized or customized to the needs or preferences of individual consumers, but also the telecommunication network or system, or the customer premise equipment, automatically learns these preferences by observing the actual or real actions or activities of the individual consumer. These various embodiments of the present invention thereby provide significant advantages to a telecommunication consumer.

From the foregoing, it will be observed that numerous variations and modifications may be effected without departing from the spirit and scope of the novel concept of the invention. It is to be understood that no limitation with respect to the specific methods and apparatus illustrated herein is intended or should be inferred. It is, of course, intended to cover by the appended claims all such modifications as fall within the scope of the claims.

I claim:

1. A method for personal telecommunication speed calling, the method comprising:
   (a) selecting an affinity name from an affinity database, the affinity database having a plurality of affinity names and corresponding affinity numbers, the plurality of corresponding affinity numbers having been determined by including telephone numbers corresponding to outgoing telecommunication calls, and by including telephone numbers from received incoming calls having a selected, predetermined non-zero minimum off-hook duration; and
   (b) automatically dialing an affinity number corresponding to the selected affinity name.

2. The method of claim 1, further comprising:
   accessing a network server;
   requesting an affinity name corresponding to an affinity number; and
   adding the affinity name corresponding to the affinity number to the affinity database.

3. The method of claim 1, further comprising:
   accessing a network database;
   requesting an affinity name corresponding to an affinity number; and
   adding the affinity name corresponding to the affinity number to the affinity database.

4. The method of claim 1, wherein the affinity database is maintained as an affinity stack.

5. The method of claim 4, wherein any affinity numbers, of the plurality of affinity numbers, having a comparatively higher frequency of use are clustered in an upper portion of the affinity stack.

6. The method of claim 4, wherein any affinity numbers, of the plurality of affinity numbers, having a comparatively higher duration of use are clustered in an upper portion of the affinity stack.

7. The method of claim 4, further comprising:
ordering the affinity stack for user display.

8. An apparatus for personal telecommunication speed calling, the apparatus comprising:
a network interface for transmitting an outgoing telecommunication call and for receiving an incoming telecommunication call;
a receiver coupled to the network interface, the receiver for decoding caller identification information from a received incoming telecommunication call;
a memory, the memory storing an affinity database having a plurality of affinity names and corresponding affinity numbers;
a user output interface for display of the affinity database;
a user input interface for entering a telephone number corresponding to the outgoing telecommunication call, and for selection of an affinity name, of the plurality of affinity names, from the affinity database; and
a processor coupled to the network interface, to the receiver, to the memory, to the user input interface and to the user output interface, wherein the processor includes instructions for obtaining from the memory an affinity number corresponding to the selected affinity name, and through the network interface, automatically dialing the affinity number corresponding to the selected affinity name; and wherein the processor includes further instructions for determining the plurality of affinity names and corresponding affinity numbers by including in the affinity database a plurality of telephone numbers corresponding to a plurality of outgoing telecommunication calls and by including in the affinity database a plurality of telephone numbers corresponding to a plurality of received incoming telecommunication calls having a selected, predetermined non-zero minimum off-hook duration.

9. The apparatus of claim 8, wherein the processor includes further instructions for accessing a network server through the network interface; for requesting from the network server an affinity name corresponding to an affinity number; and for adding to the affinity database an affinity name corresponding to the affinity number received from the network server.

10. The apparatus of claim 8, wherein the processor includes further instructions for maintaining the affinity database as an affinity stack.

11. The apparatus of claim 10, wherein the processor includes further instructions for clustering, in an upper portion of the affinity stack, any affinity names and corresponding affinity numbers, of the plurality of affinity names and corresponding affinity numbers, having a comparatively higher frequency of use.

12. The apparatus of claim 10, wherein the processor includes further instructions for clustering, in an upper portion of the affinity stack, any affinity names and corresponding affinity numbers, of the plurality of affinity names and corresponding affinity numbers, having a comparatively higher duration of use.

13. The apparatus of claim 10, wherein the processor includes further instructions for ordering the affinity stack for display on the user output interface.

14. The apparatus of claim 8, wherein the apparatus is embodied within customer premise equipment.

15. The apparatus of claim 8, wherein the apparatus is embodied within a telephone.

16. The apparatus of claim 8 wherein the user output interface is an LCD display.

17. The apparatus of claim 8 wherein the user output interface is a video display.

18. The apparatus of claim 8 wherein the user input interface is a keypad.

19. A system for personal telecommunication speed calling, the system comprising:
a line unit couplable to customer premise equipment for transmission of an affinity database to the customer premise equipment, for reception of a selected affinity name, and for reception of a telephone number corresponding to an outgoing telecommunication call;
a network signaling interface for receiving network signaling information; a network trunk interface for receiving corresponding network communications;
a memory storing the affinity database, the affinity database having a plurality of affinity names and corresponding affinity numbers; and
a processor coupled to the memory, to the line unit, to the network signaling interface, and to the network trunk interface, wherein the processor includes instructions for obtaining from the memory an affinity number corresponding to the selected affinity name, and through the network signaling interface, automatically dialing the affinity number corresponding to the selected affinity name; wherein the processor includes further instructions for including in the affinity database the telephone number corresponding to the outgoing telecommunication call; and wherein the processor includes further instructions for including in the affinity database a name and corresponding telephone number from a user received incoming telecommunication call having a selected, predetermined non-zero minimum off-hook duration.

20. The system of claim 19, wherein the processor includes further instructions for accessing a network database through the network interface; for requesting from the network database an affinity name corresponding to an affinity number; and for adding to the affinity database an affinity name corresponding to the affinity number received from the network database.

21. The system of claim 19, wherein the processor includes further instructions for maintaining the affinity database as an affinity stack.

22. The system of claim 21, wherein the processor includes further instructions for clustering, in an upper portion of the affinity stack, any affinity names and corresponding affinity numbers, of the plurality of affinity names and corresponding affinity numbers, having a comparatively higher frequency of use.

23. The system of claim 21, wherein the processor includes further instructions for clustering, in an upper portion of the affinity stack, any affinity names and corresponding affinity numbers, of the plurality of affinity names and corresponding affinity numbers, having a comparatively higher duration of use.

24. The system of claim 19, wherein the system is embodied in a network switch.

25. The system of claim 19, wherein the system is embodied in a central office.

26. A system for personal telecommunication speed calling, the system comprising:

a line unit couplable to customer premise equipment for transmission of an affinity database to the customer premise equipment, for reception of a selected affinity name, and for reception of a telephone number corresponding to an outgoing telecommunication call;

a memory storing the affinity database, the affinity database having a plurality of affinity names and corresponding affinity numbers; and processor coupled to the memory and to the line unit, wherein the processor includes instructions for obtaining from the memory an affinity number corresponding to the selected affinity name, and through the line unit, for automatically dialing the affinity number corresponding to the selected affinity name; wherein the processor includes further instructions for including in the affinity database the telephone number corresponding to the outgoing telecommunication call and a telephone number from a user received incoming telecommunication call having a selected, predetermined non-zero minimum off-hook duration.

27. The system of claim 26, wherein the processor includes further instructions for accessing a network database; for requesting from the network database an affinity name corresponding to an affinity number; and for adding to the affinity database an affinity name corresponding to the affinity number received from the network database.

28. The system of claim 26, wherein the processor includes further instructions for maintaining the affinity database as an affinity stack.

29. The system of claim 28, wherein the processor includes further instructions for clustering, in an upper portion of the affinity stack, any affinity names and corresponding affinity numbers, of the plurality of affinity names and corresponding affinity numbers, having a comparatively higher frequency of use.

30. The system of claim 28, wherein the processor includes further instructions for clustering, in an upper portion of the affinity stack, any affinity names and corresponding affinity numbers, of the plurality of affinity names and corresponding affinity numbers, having a comparatively higher duration of use.

31. The system of claim 26, wherein the system is embodied in a network switch.

32. The system of claim 26, wherein the system is embodied in a central office.

* * * * *